United States Patent
Pontello et al.

(10) Patent No.: US 7,429,087 B2
(45) Date of Patent: Sep. 30, 2008

(54) AIR SYSTEM INSTALATION TO BE APPLIED IN TRACTORS, COMBINE HARVESTERS, CROP-SPRAYERS, SEWERS, GRAIN AUGERS, HOPPERS, TRAILERS, WAGONS, CARTS AND TOWING VEHICLES TO SUPPORT AND TRANSPORT DIFFERENT KINDS OF CARGOS SUCH AS CEREALS

(76) Inventors: Jose Luis Pontello, Los Andes 628, Rosario, Provincia Santa Fé (AR); Daniel Alberto Pontello, Cafferata 547, Rosario Provincia Santa Fé (AR); Claudio Angel Pontello, San Nicolas 260, Rosario Provincia santa Fé (AR); Marcelo Alejandro Pontello, Gutemberg 1239, Rosario Provincia Santa Fé (AR)

( * ) Notice: Subject to any disclaimer, the term of this patent is extended or adjusted under 35 U.S.C. 154(b) by 127 days.

(21) Appl. No.: 10/979,559

(22) Filed: Nov. 2, 2004

(65) Prior Publication Data

US 2005/0127743 A1     Jun. 16, 2005

(30) Foreign Application Priority Data

Dec. 10, 2003   (AR)   .............................. P030104546

(51) Int. Cl.
   *B60T 13/00*   (2006.01)
(52) U.S. Cl. .................. 303/7; 303/3; 303/40; 303/127
(58) Field of Classification Search ...................... 303/3, 303/40, 7, 9, 13, 28, 127; 280/86.5
   See application file for complete search history.

(56) References Cited

U.S. PATENT DOCUMENTS

| | | | | |
|---|---|---|---|---|
| 3,574,413 | A * | 4/1971 | Euga | 303/7 |
| 4,050,746 | A * | 9/1977 | Durling | 303/40 |
| 4,121,873 | A * | 10/1978 | Durling | 303/7 |
| 4,544,385 | A * | 10/1985 | Tanaka | 96/114 |
| 5,295,736 | A * | 3/1994 | Brearley | 303/7 |
| 5,335,978 | A * | 8/1994 | laBastide, Jr. | 303/13 |
| 5,340,212 | A * | 8/1994 | Latvala | 303/7 |
| 5,458,402 | A * | 10/1995 | Jeffery | 303/13 |
| 6,007,159 | A * | 12/1999 | Davis et al. | 303/89 |
| 6,398,236 | B1 * | 6/2002 | Richardson | 280/86.5 |
| 6,655,750 | B2 * | 12/2003 | Soupal | 303/9 |
| 6,880,327 | B2 * | 4/2005 | Sabelstrom et al. | 60/280 |

\* cited by examiner

*Primary Examiner*—Robert A. Siconolfi
*Assistant Examiner*—Mariano Sy
(74) *Attorney, Agent, or Firm*—Evelyn A. Defilló; Defillo & Associates, Inc

(57) ABSTRACT

The present invention includes a pneumatic system for an agro-industrial vehicle including an air compressor, a dual circuit foot valve connected to the air compressor, and at least two air storage tanks connected to said dual circuit foot valve. The operation of the dual circuit valve establishes an air pressure link from the storage tanks to a rear air chamber as well as to a front air chamber. Each storage tank fills the rear or front air chambers and the movement of the rear air chamber and the front air chamber activate a brake device.

6 Claims, 3 Drawing Sheets

AIR SYSTEM INSTALATION TO BE APPLIED IN TRACTORS, COMBINE HARVESTERS, CROP-SPRAYERS, SEWERS, GRAIN AUGERS, HOPPERS, TRAILERS, WAGONS, CARTS AND TOWING VEHICLES TO SUPPORT AND TRANSPORT DIFFERENT KINDS OF CARGOS SUCH AS CEREALS

TECHNICAL FIELD OF THE INVENTION

This invention refers to an air system for tractors used in drawing farm equipments, agricultural machinery such as combine harvesters, crop-sprayers, sowers, hoppers, grain augers, trailers, carts, towing vehicles to support and transport different kinds of cargos such as cereals.

DESCRIPTION OF THE PRIOR ART

Nowadays, it is widely known that agricultural machines such as tractors lack air brakes and a system able to produce air which is eventually used by other devices, such as hoppers, towing vehicles, agro-industrial tractors or pulling trailers which may need pneumatic pressure in the brake system.

The brakes system of this invention will produce compressed air in order to be eventually applied to combines harvesters, tractors, crop sprayers, sowers or any devices. This equipment will require the use of compressed air while sowing (sower), field spraying (crop sprayer) and harvesting (combine harvester).

The brakes system of the present invention will also be used in grain augers of large and medium size, as well as in all size hoppers, trailer harvesters, and agro industrial carts. This is a safe, clean and non-polluting air brakes system which allows the supply of compressed pneumatic pressure in the machinery and/or the vehicles previously mentioned.

SUMMARY OF THE INVENTION

The purpose of this invention is to generate, control, minimize and maximize air pressure by means of interrelations and relations of different pneumatic groups and subgroups.

The pneumatic pressure generated by the system will be used when the pneumatic suspension is applied to the specified vehicle.

BRIEF FIGURES DESCRIPTION

The invention has been illustrated in terms of three different figures in order to make a clear description of its elements and devices.

Figure 1:
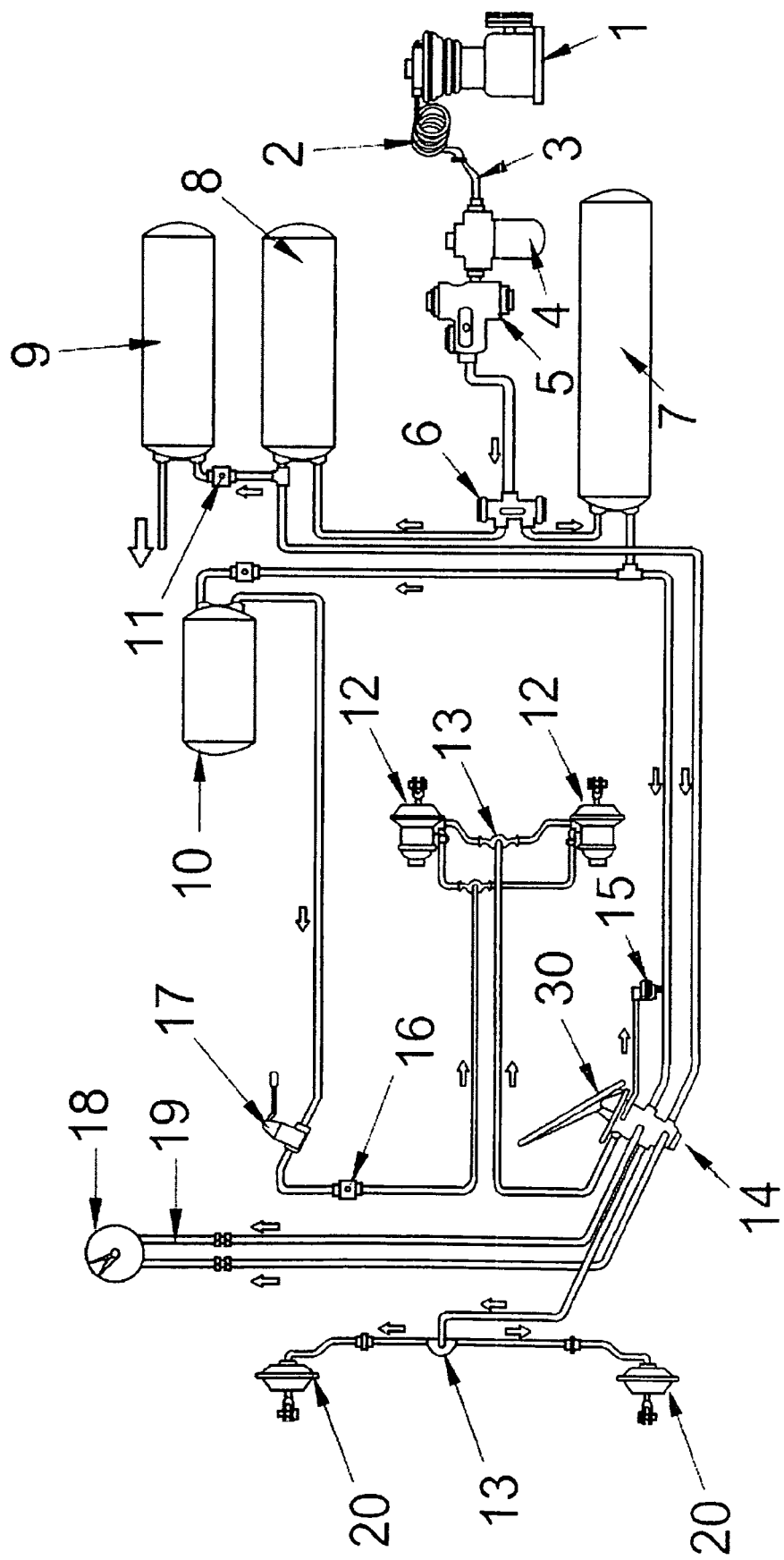

FIG. 1: It illustrates the elements distribution in terms of a simple pneumatic brakes circuit.

Figure 2:
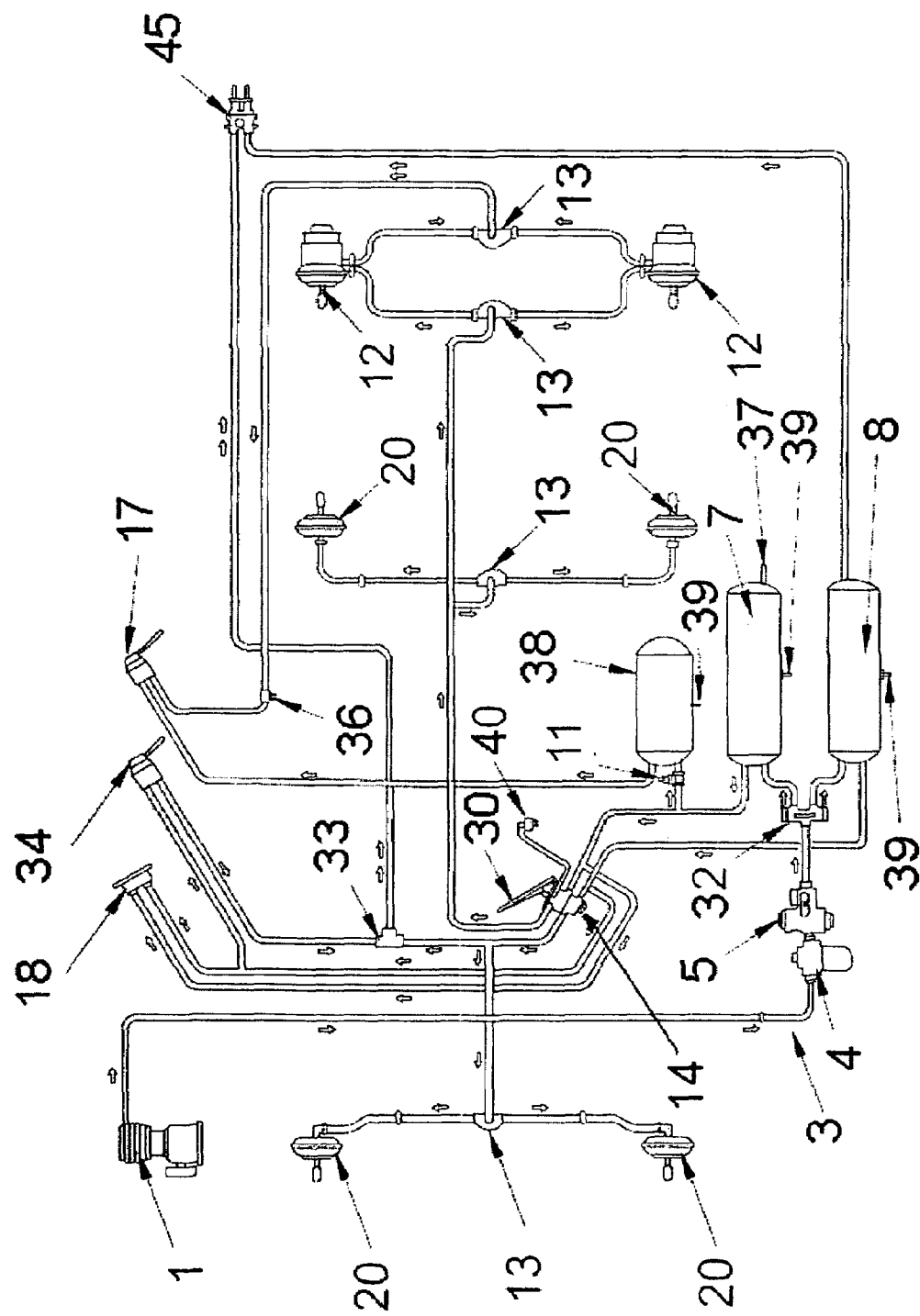

FIG. 2: It illustrates the elements distribution in a dual pneumatic brakes circuit.

Figure 3:
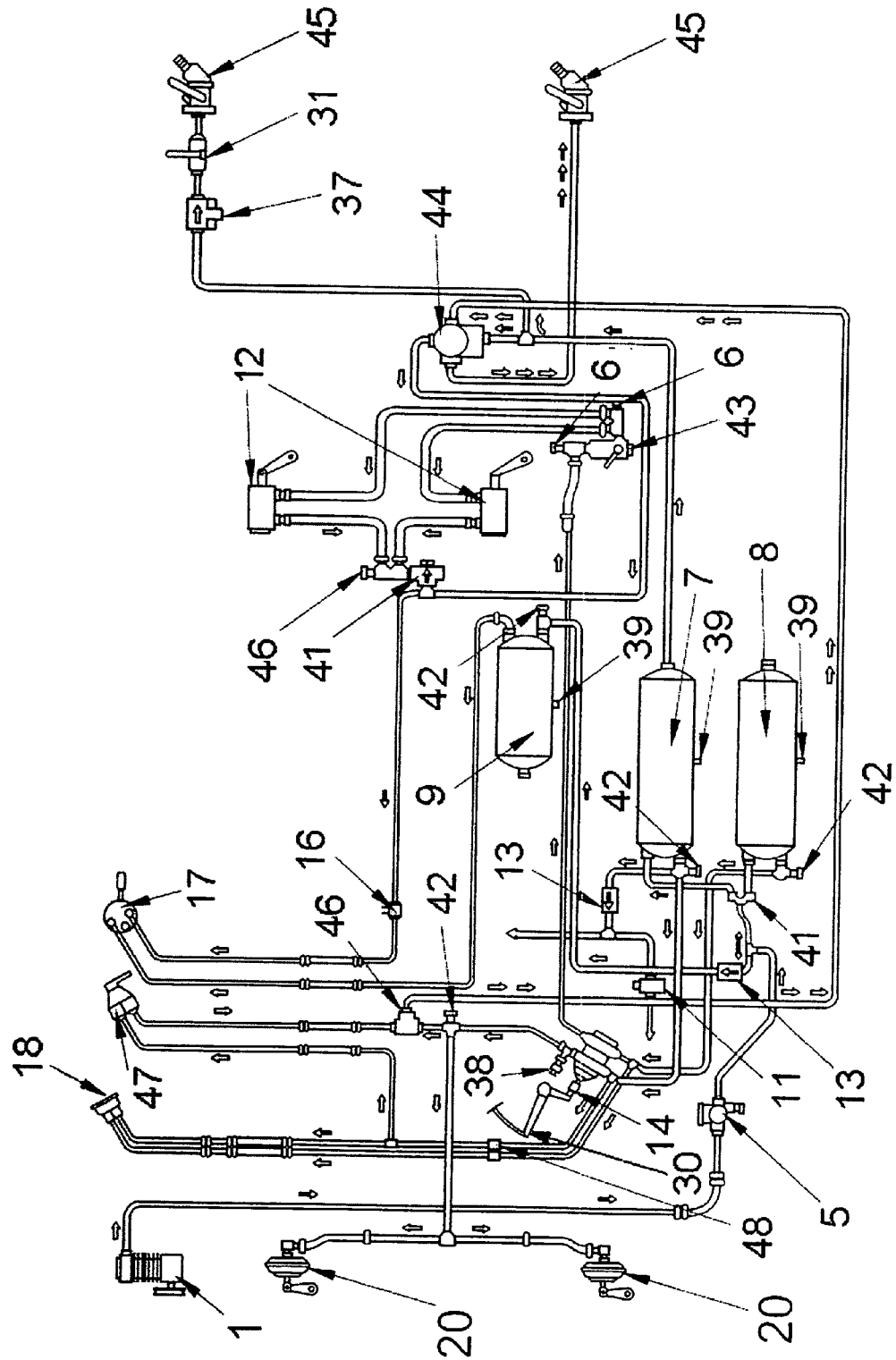

FIG. 3: It illustrates a double pneumatic brakes circuit where sensitive valves to cargo as well as valves to control trailers have been added.

DETAILED DESCRIPTION OF THE INVENTION

As shown in FIG. 1, the simple brakes circuit consists of an air compressor 1, where the compressed air is generated. This device takes air in through a separate filter, the air is compressed, and either sent to the brakes system or stored it in air tanks under a certain pressure. The compressor runs by means of gears placed inside the compressor's engine distribution, by pulleys and drive belt which are adjusted to the cramshaft movement and/or gimbals of irregular rotation or by gimbals of irregular movements. Its refrigeration can be achieved with water, oil or air. The compressor's engine may consist of one or two cylinders and its lubrication may be produced by the engine itself or by the oil pressure within the engine. A spiral pipe 2 will be placed so as to cool the air, a flexible joint 3 will be included to prevent the bodywork and the engine from moving. At the same time, the engine connects the spiral pipe to the air decanter 4, which will keep inside the moisture from the air. Therefore this air decanter will get rid of the water from the air system.

The pneumatic system of the present invention further comprises at least one filter connected to the air compressor 1, a pressure measurement control device 18 connected to said dual circuit foot valve, and a governor valve 5 connected to said compressor.

A governor valve 5 to control air pressure throughout the system will keep the pressure at 8 kg./cm$^2$ or 112 pound/square inches; another valve 6 will put the air input into different tanks avoiding its return; a rear brake tank 7 and a front brake tank 8 will store stocks of air in order to be used in the rear and front brake circuits, respectively; a storage tank 9 will store stocks of air in order to be used in the pneumatic suspension system; a tank 10 for the handbrake will store stocks of air, which can be manually or automatically used in case of emergency; an air-stop valve 11 will allow the air to enter in only one direction avoiding its return.

This system includes rear air chambers 12 which receive air pressure which will result in a mechanical motion and will put pressure on the camshafts. These devices run with a rubber diaphragm classified as pneumatic cylinders, which are supplied with, seals, O'rings, U-packings. The cylinders can be part of a dual circuit system used as parking or emergency brake as long as they are operated in the vehicle's traction system.

There is also a jettison valve 13 to reduce the time spent in the air release. A foot valve of dual circuit 14 will send air pressure to both circuits independently. This device is a safety measure in case the system fails to make sure the vehicle's brakes will always work. There is also a stop bulb comprising an electrical pneumatic valve. This will receive an air signal that will result in an electrical signal due to pressure lower than 4 kg/cm$^2$. Therefore, a warning light will be displayed on the instrument panel. There is a parking or emergency handbrake valve 17 used to apply the brakes system manually, temporarily or permanently in case of a pressure fall lower than 4 Kg./cm2. A manometer 18 is also included.

Flexible joints 19 will be made of rubber with a steel braid inside. There is also an external rubber of 22 mm in diameter covering the joint. The distance between the wires will be 1.5 mm. The female and male parts will be sealed by an aluminum gasket. The system will also include front air chambers 20 that will be in charge of not only receiving air pressure and turn it into a mechanical motion but also putting pressure on the camshaft. The cylinders can be part of a dual circuit system to be used as a parking or emergency brake when they do not run in the vehicle's traction system since they operate in front brakes.

This system is easy to understand once a clear definition of all the elements used in the present invention is provided. As it is previously mentioned, the users will hold down the pedal 30 so the air fills each of the rear and front chambers 12 and 20. This procedure brakes the vehicle. In case of emergency, a handbrake valve 17 will fill the rear chambers with air 12. This motion produces the exact pressure on the camshafts so the vehicle will quickly brake.

In FIG. 2 a dual circuit brake system is shown, which includes several elements of the system described in FIG. 1: an air compressor 1, an air decanter 4, an air governor valve 5, a protective and distributor valve 32 comprising four circuits 32, which puts the air input into the different tanks o as to prevent the loss of air, dual circuit foot valve 14. The foot valve sends air pressure to both circuits separately because if one circuit fails, the vehicle will not loose its complete brake system. There is also a stop bulb 40, an air stop valve 11, which will allow the air to enter in only one direction avoiding its return, a distributor and protective valve 33 comprising two circuits which will receive the air through the main tubing. Then the air is sent to two different circuits. At the same time it protects the circuits from a loss of pressure. There are front and rear air chambers 20 and 12, a jettison valve 13, a manometer 18, a handbrake valve for the trailer that will brake the trailer manually by means of pulling out a handle 34, a valve 35 to be used as a parking or emergency brake 17, a low pressure bulb 36, a two way device which will connect the vehicle to the trailer in a safe and automatic way. There will be a permanent flow of air inside which will result in an "air signal" as well as a safety valve 37 with a 9 kg/cm pressure opening. In case of requiring a lower or higher level of pressure, the device will fit the right pressure. This valve will operate only when the system fails or the governor valve stops running. There will also be hand brake tanks 38, a rear brake tank 7, front brake tanks 8, a faucet 39 placed in the low part of the tanks. The faucet is used to remove the water or oil remaining inside the tanks.

This system is easy to understand once a clear definition of all the elements or devices used in this invention is provided. The users will just hold down the pedal 30 so the air fills each of the rear and front chambers 12 and 20. This procedure will brake the vehicle. In case of emergency, the vehicle will be braked manually by means of a handbrake 31 which will fill the rear chambers 12 with air. This motion produces the right pressure on the camshafts so the vehicle will quickly brake.

FIG. 3 shows a complex brake system of dual circuit which consists of front air chambers 20; a brake pedal 30 with a dual circuit foot valve 14 which is operated mechanically. It turns the motion into an air opening. The dual circuit foot valve 14 is foot operated and as it consists of two circuits, it sends the air to both circuits separately. This is a safety measure in case the system fails so as to make sure the vehicle's brakes will always work.

A governor valve 5 with a filter and connections to fill tires (not shown) will control the air pressure in the whole system. The proper pressure is 8 Kg/cm$^2$ 112 pound/inches$^2$; the air is filtered when it gets into the brake system. There will also be an air pump used to fill tires, to release blast of air in gas filters etc.

A valve 11 to stop the engine will be operated by means of a lever near the foot on the cabin floor. This valve will pneumatically close a gate in the engine so that it can slow down the engine revolutions. There will also be a jettison valve 13 to reduce the time of the air release, a dual safety valve 41 with a 4 Kg./cm2 air opening in one circuit and 5 Kg./cm2 in the other; a control connection 42 comprising a screw thread and a pump to measure or release air pressure; front air brake tanks 8 and trailers or wagons; a faucet 39 to remove moister, air chambers with blockers 42; a pressure regulator according to cargo (sensitive valves to cargo) 43 which regulates the vehicle's cargo considering the intensity of the brakes in the shaft by means of a detector, a relay valve 44 to brake the trailer or wagon. This valve will receive three signals: the first one corresponds to the foot valve 14 or pedal 30, the second one corresponds to the trailer hand brake and the third one to the parking and emergency brake valves. These signals are transmitted and multiplied to the trailer.

A two way device 45 in trailers and wagon hoses will connect the vehicle or tractor to the wagon or trailer in a safe, automatic and quick manner. There will be a permanent flow of air inside which represents the "air signal", a handbrake 31 will avoid loss of air by means of controlling the air pressure. There will also be a safety regulator valve 37 to check whether the air goes to the trailer properly. This valve will allow proper air pressure input in the trailer. There will be an air pressure in the tractor, sewer or harvester of 9 Kg/cm2 the air pressure to the trailer will be only limited to 6 Kg/cm2.

The air inside the tanks 9 are used in the parking and emergency brakes. It will be stored as reserve, and it can be used manually and automatically in emergency situations by means of lowering the pressure in the air system, a hand brake device 38 comprising a pneumatic and electrical valve that will receive an air signal which will result into an electrical signal. There are also a parking and emergency hand brake 17 which will apply the brake system to the rear circuit temporarily or permanently. This brake will also be applied automatically if there is a low of pressure lower than 4 Kg./cm2. A two way valve 46 will receive the air through the main tubing transferring it to the both circuits separately. This will additionally protect the circuits from a loss of pressure.

In this brake system (FIG. 3), there are also a hand brake valve 47 for trailers to brake the vehicle manually by means of pulling out a lever. This action is totally pneumatic and electrical pneumatic. An air compressor 1 is also included together with an electrical pneumatic device 48 of low pressure which will turn a loss of pressure lower than 4 Kg./cm2 into an electrical signal. A warning light 16 will be displayed on the instrument panel, an electrical pneumatic device used in the parking brake comprising an electrical pneumatic valve. In case of a loss of pressure the valve will produce an electrical signal. A warning light will be displayed on the instrument panel to show that the parking or the emergency brake is activated.

Each of the air brakes systems as well as pneumatic suspension described may be applied to any tractor or pulled equipment regardless the vehicle trademark and origin. This system works parallel with the hydraulic and mechanic brake systems that tractors originally include. The original brake system may be modified to turn it completely pneumatic. Therefore, the pneumatic system is compatible to other systems assuring the system run properly by means of a clean, safe and non-polluting air system.

The pneumatic suspension system can modify the height of all the equipment according to the vehicle's needs. This system can also be fully automatic according to the land.

What is claimed is:
1. A pneumatic system for supplying compressed air to an agro-industrial vehicle and/or agro-industrial machinery, the system comprising:
   an air compressor,
   at least one filter connected to said air compressor, wherein the air compressor takes air from the atmosphere through the filter;
   a governor valve connected to the air compressor, wherein the governor valve controls air pressure through the system;
   an air decanter connected between the compressor and the governor valve;
   a dual circuit foot valve connected to the air compressor, the dual circuit foot valve having a) a first chamber, b) a second chamber, c) a first main outlet and a second main outlet, and d) a two-way device to connect the agro-industrial vehicle with a hose on the agro-industrial machinery;

each chamber having an air inlet and an air outlet, wherein the air outlet of each chamber is connected to a pressure measurement device;

at least two air storage tanks connected to said dual circuit foot valve, wherein one of the storage tanks is connected to the air inlet on each chamber;

wherein the first main outlet is connected to a rear circuit having a first air chamber and the second main outlet is connected to a front circuit having a second air chamber, wherein the dual circuit foot valve sends air pressure to the rear circuit and the front circuit independently;

wherein the operation of the dual circuit valve establishes an air pressure link from the storage tanks to the first air chamber, as well as to the second air chamber, wherein the movement of the dual circuit foot valve activates a vehicle's air brake device, wherein the agro-industrial machinery is chosen from harvesters, crop-sprayers, sewers, hoppers, grain augers, wagons, carts, towing vehicles, or combination thereof;

wherein the system is adapted to work in parallel with a brake system of the agro-industrial vehicle and at the same time provide pneumatic pressure to the agro-industrial machinery.

2. A pneumatic system according to claim 1 further comprising at least one manual operation device, wherein an opening of the manual operating device connects the flow of air contained in an auxiliary storage tank to the rear and front air chambers to brake the vehicle.

3. A pneumatic system according to claim 1 further comprising four front air chambers and two rear air chambers connected to said dual circuit foot valve and to the brake device.

4. A pneumatic system according to claim 1 further including an auxiliary air storage tank in connection with said air compressor.

5. A pneumatic system according to claim 1 further comprising air pressure detectors connected to a circuit line which connects said front and rear air chamber, wherein the air pressure detectors indicate the excess or lack of air pressure in the system.

6. A pneumatic system for supplying compressed air to an agro-industrial vehicle and/or an agro-industrial machinery, the system consisting of:

an air compressor;

a filter connected to said air compressor, wherein the air compressor takes air from the atmosphere through the filter;

a governor valve connected to the air compressor, wherein the governor valve controls air pressure through the system;

an air decanter connected between the compressor and the governor valve;

a dual circuit foot valve connected to the air compressor, the dual circuit foot valve having a) a first chamber, b) a second chamber, c) a first main outlet and a second main outlet, and d) a two-way device to connect the agro-industrial vehicle with a hose on the agro-industrial machinery;

each chamber having an air inlet and an air outlet, wherein the air outlet of each chamber is connected to a pressure measurement device;

two air storage tanks connected to said dual circuit foot valve, wherein one of the storage tanks is connected to the air inlet on each chamber;

wherein the first main outlet is connected to a rear circuit having a first air chamber and the second main outlet is connected to a front circuit having a second air chamber, wherein the dual circuit foot valve sends air pressure to the rear circuit and the front circuit independently;

wherein the operation of the dual circuit valve establishes an air pressure link from the storage tanks to the first air chamber, as well as to the second air chamber, wherein the movement of the dual circuit foot valve activates a vehicle's air brake device, wherein the system is adapted to work in parallel with a brake system of the agro-industrial vehicle and at the same time provide pneumatic pressure to the agro-industrial machinery.

\* \* \* \* \*